United States Patent [19]

Suzuki et al.

[11] Patent Number: 4,870,499

[45] Date of Patent: Sep. 26, 1989

[54] IMAGE PROCESSING APPARATUS

[75] Inventors: Yoshiyuki Suzuki, Kawasaki; Hiroaki Ishii, Tokyo, both of Japan

[73] Assignee: Canon Kabushiki Kaisha, Tokyo, Japan

[21] Appl. No.: 237,614

[22] Filed: Aug. 24, 1988

Related U.S. Application Data

[63] Continuation of Ser. No. 900,603, Aug. 26, 1986, abandoned.

[30] Foreign Application Priority Data

Aug. 29, 1985 [JP] Japan ................................. 60-188397
Aug. 29, 1985 [JP] Japan ................................. 60-188398
Oct. 17, 1985 [JP] Japan ................................. 60-229959
Dec. 13, 1985 [JP] Japan ................................. 60-281639

[51] Int. Cl.$^4$ ........................................... H04N 1/00
[52] U.S. Cl. ..................................... 358/443; 358/298; 358/456
[58] Field of Search ................... 358/283, 280, 298

[56] References Cited

U.S. PATENT DOCUMENTS

| | | | |
|---|---|---|---|
| 3,842,312 | 10/1974 | Emmons | 358/283 |
| 4,040,094 | 8/1977 | Everett et al. | 315/30 |
| 4,194,221 | 3/1980 | Stoffel | 358/283 |
| 4,196,451 | 4/1980 | Pellar | 358/283 |
| 4,295,137 | 10/1981 | Haugsjaa | 340/781 |
| 4,370,667 | 1/1983 | Ohara et al. | 358/298 |
| 4,384,297 | 5/1983 | Ohara et al. | 346/108 |
| 4,478,504 | 10/1984 | Tanaka | 355/1 |
| 4,547,811 | 10/1985 | Ochi et al. | 358/280 |
| 4,553,173 | 11/1985 | Kawamura | 358/283 |
| 4,626,923 | 12/1986 | Yoshida | 358/283 |

FOREIGN PATENT DOCUMENTS

| | | |
|---|---|---|
| 2017431 | 11/1971 | Fed. Rep. of Germany . |
| 2748725 | 5/1979 | Fed. Rep. of Germany . |
| 3322247 | 12/1983 | Fed. Rep. of Germany . |
| 3333203 | 3/1984 | Fed. Rep. of Germany . |

Primary Examiner—Edward L. Coles, Sr.
Attorney, Agent, or Firm—Fitzpatrick, Cella, Harper & Scinto

[57] ABSTRACT

In an image processing apparatus, an image signal generator includes a ROM and a D/A converter. The ROM consists of gain conversion tables. A PWM signal generator includes a frequency divider, a flip-flop, an integrator, a voltage divider, and a comparator. The frequency divider is synchronized with the ROM in response to a sync selection signal. An output from the frequency divider is further frequency-divided by the flip-flop and then converted into a triangular wave signal by the integrator. The bias component of the triangular wave signal is adjusted by the voltage divider. The resultant signal supplied to one input terminal of the comparator is compared thereby with an output from the D/A converter, thereby obtaining a PWM signal. The peak and bottom values of the triangular wave signal are always matched with the maximum and minimum values of the output from the D/A converter.

38 Claims, 12 Drawing Sheets

FIG. 13A  ORCLK 
FIG. 13B  VCLK 
FIG. 13C  1/nCLK 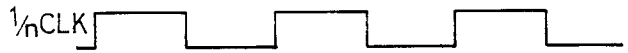
FIG. 13C'  1/mCLK 
FIG. 13D  VA 
FIG. 13E  SAW 
FIG. 13E'  SAW 

FIG. 15A  SAWn

FIG. 15B  SAWm

IMAGE PROCESSING APPARATUS

This application is a continuation, of application Ser. No. 900,603 filed Aug. 26, 1986, now abandoned.

BACKGROUND OF THE INVENTION

1. Field of the Invention

The present invention relates to an image processing apparatus for reproducing an image of high quality.

2. Related Background Art

Halftone images have been reproduced according to conventional methods such as a dither method and a density pattern method. In either method, satisfactory gradation cannot be obtained when a threshold matrix of a small size is used. In order to obtain satisfactory gradation, a threshold matrix of a large size must be used. This results in degradation of resolution and a rough texture structure due to the matrix periodic structure. As a result, a high-quality output cannot be obtained.

In order to solve the above problem, a plurality of dither matrices are used to provide multivalue dot data according to an improved conventional dither method. However, a complicated circuit arrangement is required to synchronize the respective dither matrices, resulting in a bulky and complicated image processing system. In this sense, multivalue dither processing has limitations.

Another conventional technique for forming a halftone image in a laser beam printer or the like is proposed by the present applicant. According to this technique, an input digital image signal is converted into an analog image signal, and the analog image signal is compared with a cyclic analog pattern signal such as a triangular wave signal to generate a PWM (Pulse Width Modulation) binary image signal. FIG. 5 shows an apparatus using this technique. Referring to FIG. 5, a digital video signal of eight bits VD0 to VD7 is latched and timed by a latch 1 in response to a clock signal CLK/2. The video clock signal CLK/2 is a clock signal obtained by dividing the frequency of a master clock signal CLK by a JK flip-flop 5 into halves. The latched video signal is converted by a D/A converter 2 into an analog video signal VA. The analog video signal VA is converted by a resistor 3 into a voltage signal. The voltage signal is input to one input terminal of a comparator 4. The master clock signal CLK is n-divided by a frequency divider 6 to produce a clock signal 1/n. The clock signal 1/n is further divided by a JK flip-flop 8 into halves, thus obtaining a pattern clock signal PCLK having a duty ratio of 50%. Therefore, the pattern clock signal PCLK has a period n times that of the video clock signal CLK/2. The pattern clock signal PCLK is input to an integrator constituted by a variable resistor 10 and a capacitor 11 through a buffer 9 and is converted into a triangular wave signal (i.e., an analog pattern signal) SAW having the same period as that of the pattern clock signal PCLK. The bias component of the triangular wave signal SAW is adjusted by a capacitor 12 and a variable resistor 13. The bias-adjusted signal SAW is input to the other input terminal of the comparator 4 through a protective resistor 14 and a buffer amplifier 15. The comparator 4 compares the analog video signal VA with the triangular wave signal SAW. The analog video signal VA is PWM-modulated according to a density represented thereby. In order to obtain a high gray scale value, the level of the analog video signal VA preferably has a relationship with the level of the triangular wave signal SAW, as shown in FIG. 6. Specifically, a maximum level VAmax (e.g., a black level) of the analog video signal VA coincides with a peak level of the triangular wave signal SAW, and at the same time, a minimum level VAmin (e.g., a white level) of the analog video signal VA coincides with a bottom level of the triangular wave signal SAW. With this relationship, the maximum resolution and full-scale linearity are always maintained. In order to satisfy the relationship given in FIG. 6, the amplitude of the triangular wave signal SAW is adjusted by the variable resistor 10, and the bias component thereof is adjusted by the variable resistor 13.

The apparatus described above must reproduce different types of images. For example, in a character image, accurate reproduction of changes from white to black pixels and vice versa is more important than halftone reproduction. However, in a photographic or halftone image, halftone reproduction is more important. Therefore, the period of the pattern clock signal PCLK is selected in the apparatus of FIG. 5 according to the requirement as to which reproduction mode is more important. More specifically, the frequency division ratio of the frequency divider 6 can be changed in the range of, e.g., 1 to 1/n, in response to a period selection signal SEL. In actual character image reproduction, the frequency division ratio is given as, e.g., 1, and a one-pixel component of the input digital video signal is PWM-modulated by one triangular wave signal SAW to properly reproduce a change from a white pixel to a black pixel and vice versa. However, in photographic image reproduction, the frequency division ratio is given as, e.g., n, an n-pixel component of the input digital video signal VA is PWM-modulated by one triangular wave signal SAW, thereby reproducing a natural halftone image. However, in the conventional image processing apparatus described above, the frequency, amplitude, and bias component of the triangular wave signal SAW are changed whenever the frequency division ratio is changed. This does not satisfy the relationship shown in FIG. 6 any longer. In the apparatus of FIG. 5, the resistances of the variable resistors 10 and 13 must be readjusted. In the case of a mixture of characters and photographs in one page, either type of image must be sacrificed.

SUMMARY OF THE INVENTION

It is an object of the present invention to eliminate the conventional drawbacks described above.

It is another object of the present invention to improve an image processing apparatus.

It is still another object of the present invention to provide an image processing apparatus capable of reproducing an image of high quality.

It is still another object of the present invention to provide a simple image processing apparatus capable of reproducing a good image.

It is still another object of the present invention to provide a image processing apparatus capable of reproducing an image of high quality at high speed.

It is still another object of the present invention to provide an image processing apparatus capable of reproducing an image having both good gradation characteristics and a high resolution.

It is still another object of the present invention to provide an image processing apparatus capable of performing optimal pulse width modulation according to types of images.

It is still another object of the present invention to provide an image processing apparatus capable of performing optimal pulse width modulation according ot types of images even if a character image and a photographic or halftone image are mixed in one page.

The above and other objects, features and advantages of the present invention will be apparent from the following detailed description and the appended claims in conjenction with the accompanying drawings.

BRIEF DESCRIPTION OF THE DRAWINGS

FIGS. 13A to 13G are timing charts showing waveforms of signals in the circuit of FIG. 12;

FIGS. 15A to 15D are timing charts showing waveforms of signals in the circuit of FIG. 14.

DETAILED DESCRIPTION OF THE PREFERRED EMBODIMENTS

Preferred embodiments of the present invention will be described in detail with reference to the accompanying drawings.

First Embodiment

Figure 1:
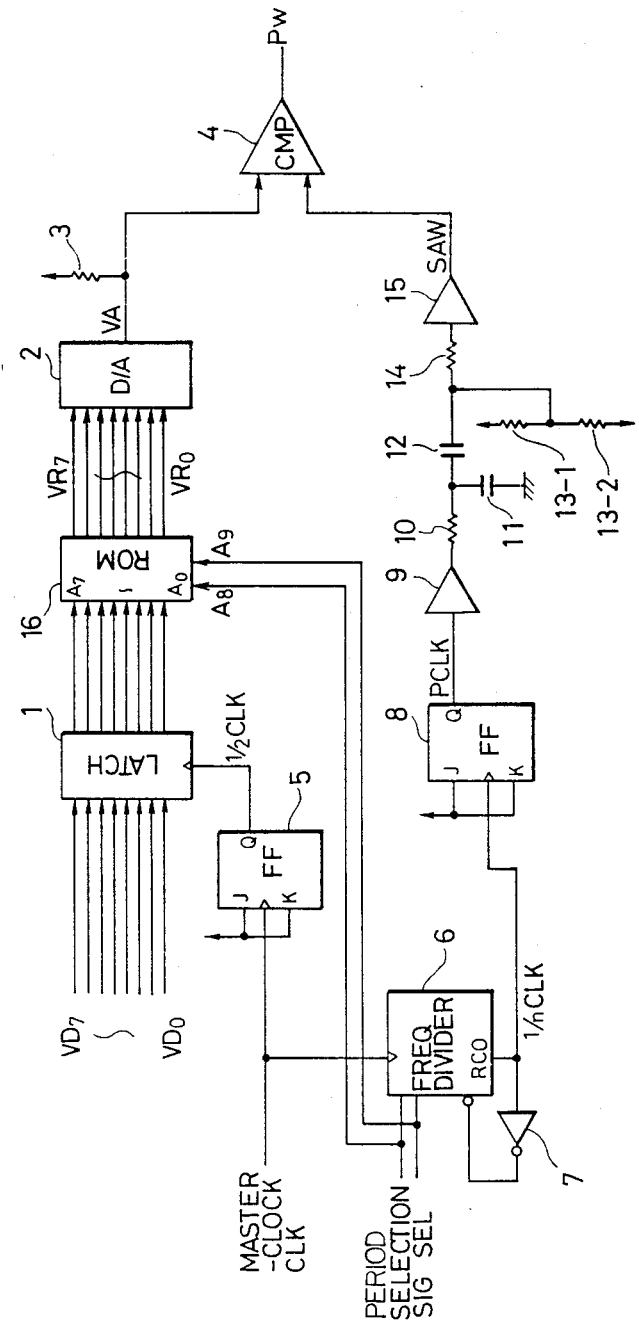
FIG. 1 is a circuit diagram of an image processing apparatus according to a first embodiment of the present invention.
Figure 5:
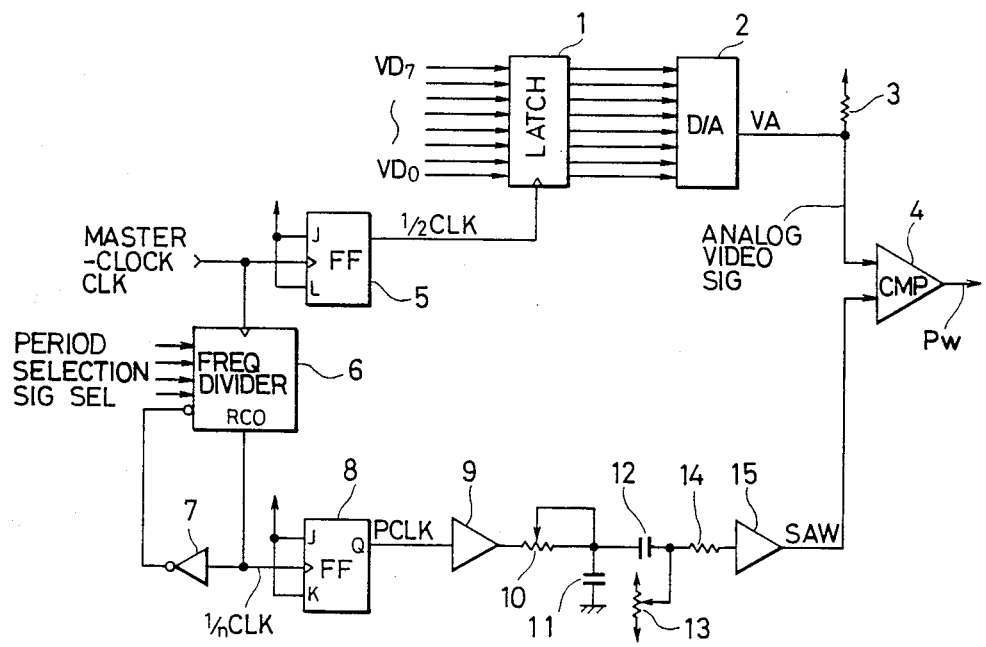
FIG. 5 is a circuit diagram showing an arrangement of a pulse width modulator.

FIGS. 1 to 3B show a first embodiment of the present invention. FIG. 1 is a circuit diagram of an analog image processing apparatus. The same reference numerals as in FIG. 5 denote the same parts in FIG. 1, and a detailed description thereof will be omitted. Referring to FIG. 1, a period selection signal SEL from a processor (not shown) is connected to a frequency divider 6 and upper address bits A8 and A9 of a ROM 16. The processor generates the period selection signal SEL according to the type of input image data (the type represents the characteristics or nature of the image). If the period selection signal SEL represents n, a clock signal CLK/n is output from the frequency divider 6. This clock is supplied to a JK flip-flop 8 to produce a pattern clock signal PCLK having a duty ratio of 50%. The pattern clock signal PCLK is input to an integrator of a resistor 10 and a capacitor 11 through a buffer 9. The integrator has a predetermined time constant determined by the resistor 10 and the capacitor 11. The integrator generates a triangular (of saw-tooth) wave signal SAW having an amplitude varying according to a designated period. The DC component of the triangular wave signal SAW is eliminated by the capacitor 12. The bias component of the triangular wave signal SAW is determined by a voltage divider consisting of resistors 13-1 and 13-2. The resultant triangular wave signal SAW is input to one input terminal of a comparator (CMP) 4.

Figure 6:
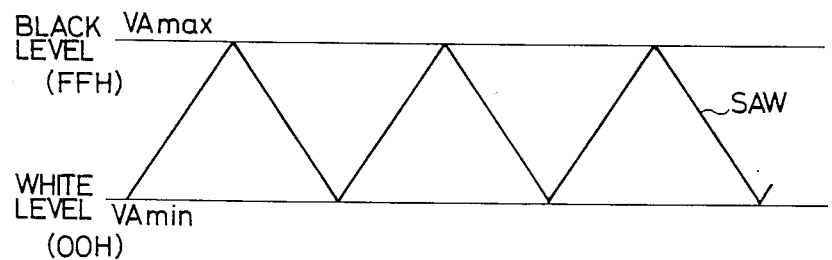
FIG. 6 is a chart showing an optimal relationship between the triangular wave signal SAW and the density level of the analog image signal VA.

A 1-kbyte ROM 16 is used to convert a gain of the input image signal (including the gain of the bias component in this embodiment). Eight bits VD0 to VD7 of the digital video signal are respectively input to lower eight bits A0 to A7 of the address terminal, and data is read out as gain conversion data bits VR0 to VR7 from the ROM 16. The gain conversion data is then converted into an analog image signal VA by the D/A converter 2. Since the ROM 16 has a capacity of 1 kbyte, the number of gain conversion tables 4 is equal to that of patterns. The gain conversion tables 4 are operated in synchronism with the frequency divider 6 in response to the period selection signal SEL and are selectively switched in response to upper address bits A8 and A9. Switching by the upper address bits A8 and A9 is performed by switching the gain and the bias level of the analog image signal VA when the period of the triangular wave signal SAW which satisfies the conditions given in FIG. 6 is switched.

Figure 2:
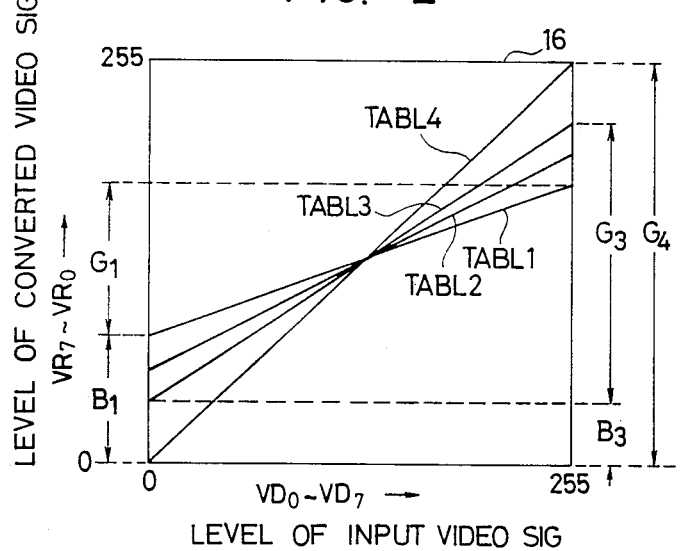
FIG. 2 is a chart showing density conversion tables in a ROM 16.

FIG. 2 is a chart showing conversion tables of the ROM 16. In the case of generating the triangular wave signal SAW by integrating the clock signal PCLK having a duty ratio of 50% at a predetermined time constant, as described above, the amplitude of the triangular wave signal SAW is increased when the designated period is prolonged. If the designated period is the longest, a conversion table TABL4 among tables TABL1 to TABL4 is selected. If the period is the second longest, TABL3 is selected. If the period is the shortest, TABL1 is selected. In any case, selection is performed to satisfy the relationship in FIG. 6.

Figure 3A:
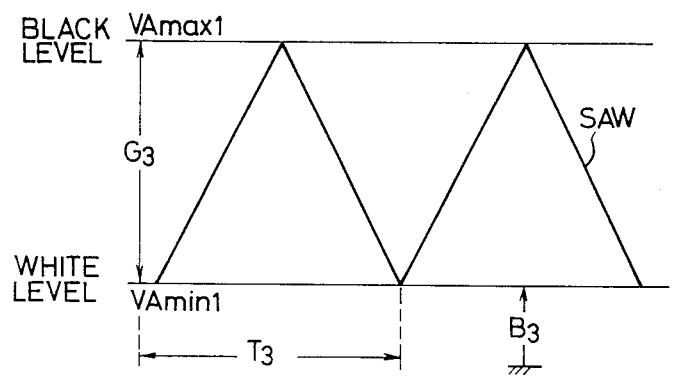
FIGS. 3A and 3B are charts showing the relationships between the triangular wave signal SAW and the density level of the analog image signal VA.
Figure 3B:
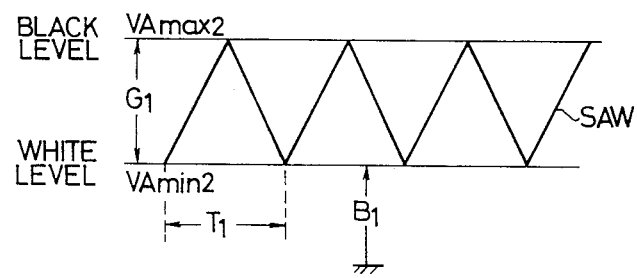

FIGS. 3A and 3B show the relationships between the triangular wave signal SAW and the analog image signal levels VAmax and VAmin when the designated period varies. In any case, the conditions (FIG. 6) concerning the amplitude and the bias component of the triangular wave signal SAW are found to be satisfied.

As described above, in character image reproduction, the frequency division ratio is given as substantially 1, and a one-pixel input digital video signal is MWM-modulated by one triangular wave signal SAW, thereby properly reproducing a change from the white pixel to the black pixel and vice versa. In photographic image reproduction, the frequency division ratio is set to be n larger than 1, and an n-pixel input digital video signal is PWM-modulated by one triangular wave signal SAW. In this manner, smooth halftone image reproduction is requested. In order to satisfy different requirements, i.e., character and photographic image reproduction modes, the image processing apparatus is operated as follows. In character image reproduction, since the designated period is short, a gain G1 is small and the tonality or gradation (i.e., a density resolution) is degraded accordingly. However, since the black or white pixel is required to be reproduced, no problem is posed. In this case, since the designated period is short, changes from the white to black pixels and vice versa can be quickly traced, thus reproducing a clear character image. In photographic image reproduction, since the designated period is long, a gain G4 is large and, the tonality (i.e., the density resolution) is effective in full scale.

Figure 4:
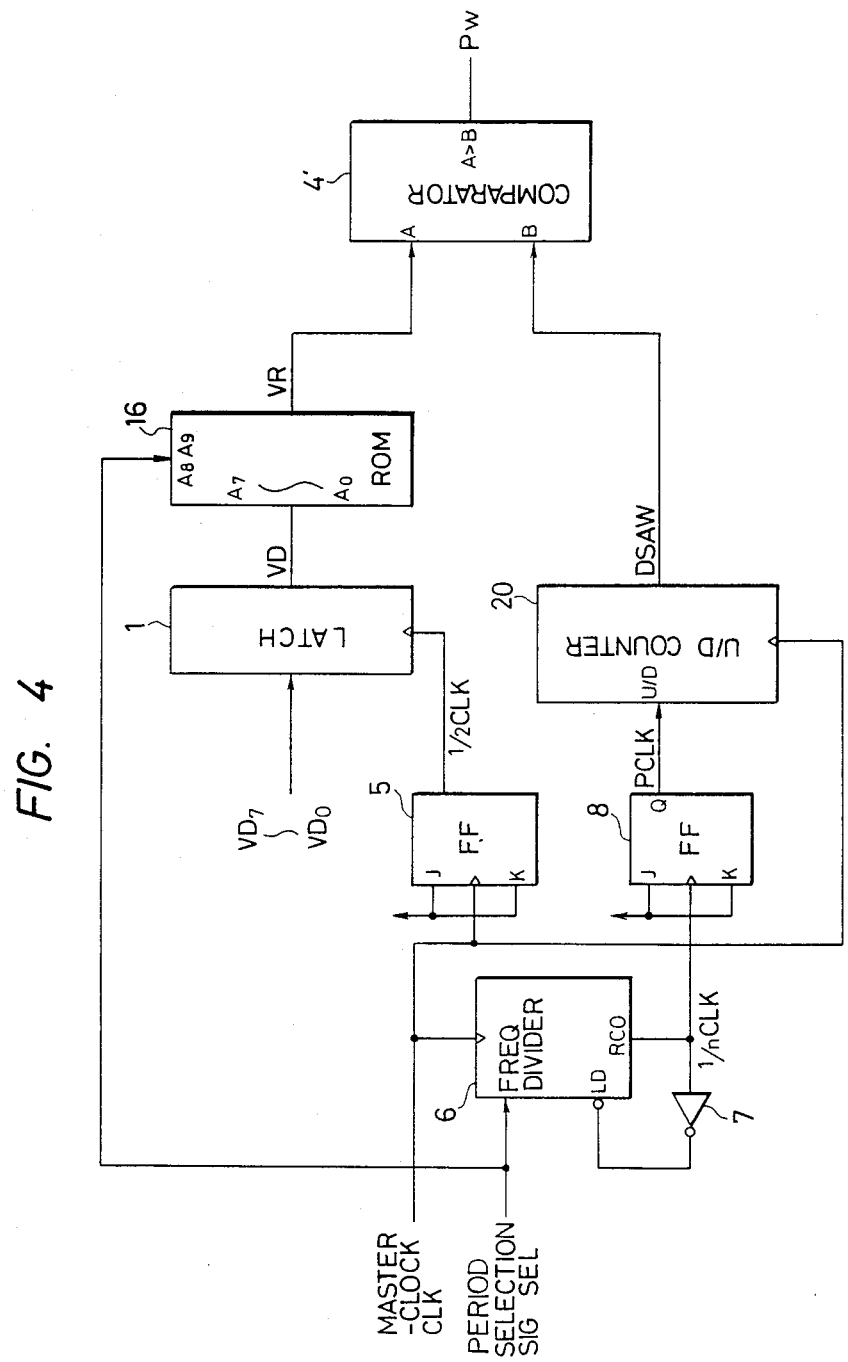
FIG. 4 is a block diagram of an image processing apparatus according to a second embodiment of the present invention.

With the arrangement of FIG. 1 as described above, when the sync selection signal SEL is designated as n, the frequency divider 6 generates the clock signal CLK/n which is then converted by the JK flip-flop 8 into the pattern clock signal PCLK having a duty ratio of 50%. The pattern clock signal PCLK is converted into the triangular wave signal SAW through an integrator consisting the resistor 10 and the capacitor 11. The DC component of the triangular wave signal SAW is eliminated by the capacitor 12, and the bias component of the signal SAW is determined by the voltage divider consisting of the resistors 13-1 and 13-2. The resultant signal is input to one input terminal of the comparator 4. The triangular wave signal SAW is a cyclic pattern signal having the designated period, and its amplitude and bias components are changed according to the designated period. The lower address bits A0 to A7 of the ROM 16 are addressed by the data bits VD0 to VD7 of the digital image signal input thereto, and the upper address bits A8 and A9 are addressed by the period selection signal SEL. The ROM 16 stores the image data conversion tables TABL1 to TABL4 defining the four gains G and the four bias components B shown in FIG. 2. One of the image data conversion tables TABL1 to TABL4 is selected in response to the period selection signal SEL. This selection operation is synchronized with the operation of the frequency divider 6. The gain of the input image signal is switched according to selection of the period (amplitude) of the cyclic pattern signal. Therefore, the peak and bottom values of the triangular wave signal SAW coincide with the maximum and minimum values VAmax and VAmin of the image signal VA after gain conversion. In other words, as shown in FIGS. 3A and 3B, if the designated period T1 is short, the gain G1 is small but the bias component B1 is large; however, if the designated period T3 is long, the gain G3 is large, but the bias component B3 is small. Second Embodiment FIG. 4 is a block diagram of an image processing apparatus according to a second embodiment wherein the functions in FIG. 1 are achieved by digital elements. The same reference numerals as in FIG. 1 denote the same parts in FIG. 2, and a detailed description thereof will be omitted. Referring to FIG. 4, an up/down counter 20 is incremented at the first half of the pattern clock signal PCLK having a duty ratio of 50% but is decremented at the second half thereof. A count clock from the up/down counter 20 is set such that the count value is multiplied with n if the period selection signal SEL represents n since the master clock signal CLK has a predetermined pulse width. A digital comparator 4' has input terminals A and B. Eight-bit digital video data which is density-converted by the conversion tables (ROM 16) in FIG. 2 is input to the input terminal A, and a triangular wave count DSAW as an output from the up/down counter 20 is input to the input terminal B. The digital comparator 4' compares the input at the terminal A with the input at the terminal B. If A >B, the comparator 4' outputs a PWM image signal PW of high level. In this manner, the arrangement of FIG. 1 is substituted by the digital elements in FIG. 4, thereby satisfying the relationships given in FIGS. 3A and 3B.

Third Embodiment

A third embodiment of the present invention will be described with reference to FIGS. 7 and 8.

Figure 7:
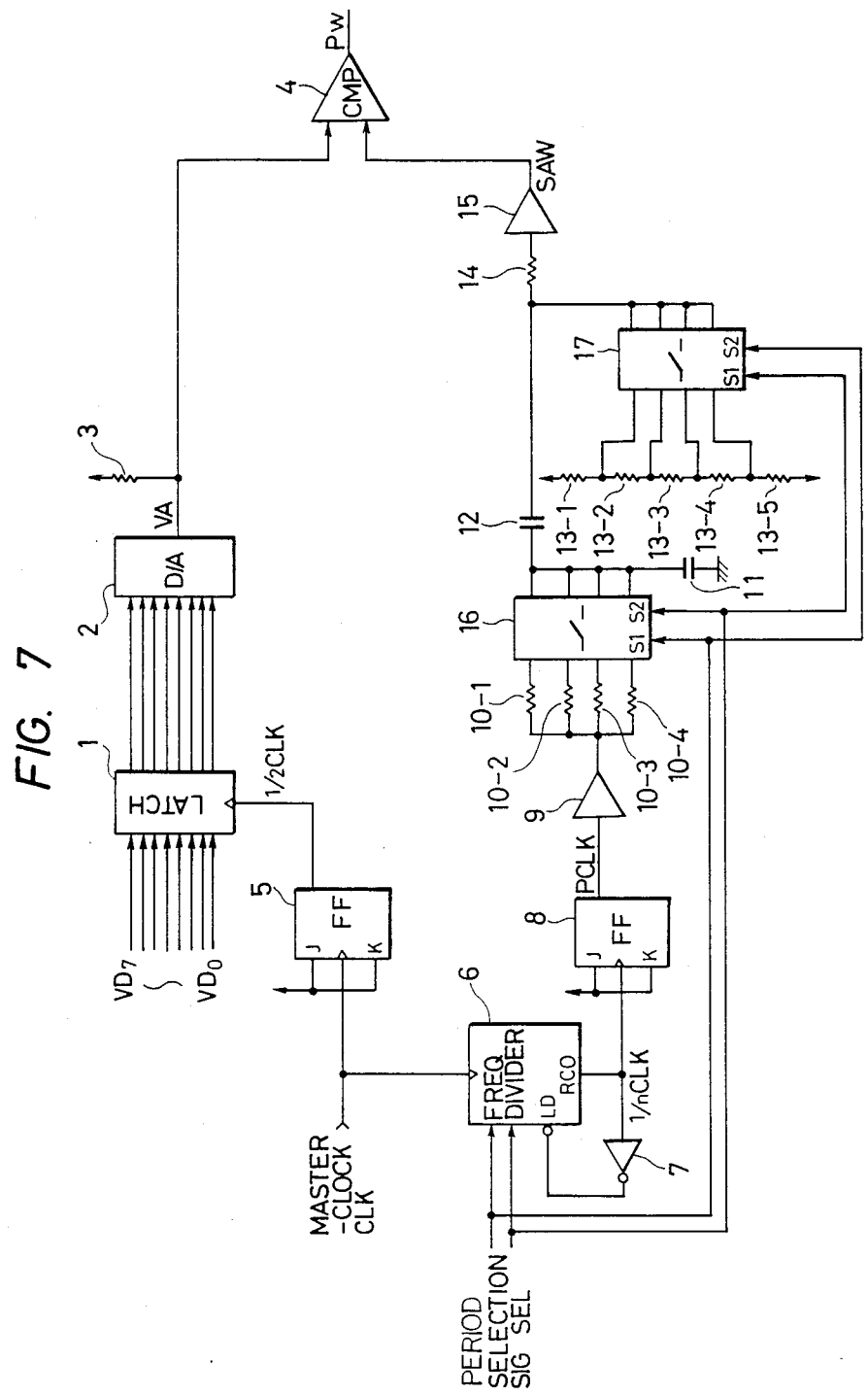
FIG. 7 is a circuit diagram of an image processing apparatus according to a third embodiment of the present invention.

FIG. 7 is a circuit diagram of an analog image processing apparatus. The same reference numerals as in FIG. 5 denote the same parts in FIG. 7, and a detailed description thereof will be omitted. Referring to FIG. 7, analog switches 16 and 17 include a plurality of electronic switches each. One of the electronic switches is turned on according to a given state of select terminals S1 and S2. In this embodiment, the period selection signal SEL is connected from a processor (not shown) to a frequency divider 6 and analog switches 16 and 17. The processor generates the period selection signal SEL according to the type of input image data (the type represents the characteristics or nature of the image). If the period selection signal SEL represents n, the frequency divider 6 generates a clock signal CLK/n, and then the JK flip-flop 8 generates a pattern clock signal PCLK having a duty ratio of 50%. The pattern clock signal PCLK is simultaneously supplied to resistors 10-1 to 10-4 through a buffer 9. When one of the resistors 10-1 to 10-4 is connected to the capacitor 11, the capacitor 11 and the resistor connected thereto constitute an integrator having a predetermined time constant determined thereby. The resistances of the resistors 10-1 to 10-4 are determined to satisfy the amplitude conditions of FIG. 6 according to the corresponding designated periods. Therefore, the analog switch 16 is synchronized with the frequency divider 6 to connect the capacitor 11 to a proper resistor having a resistance corresponding to the desired designated period, thereby satisfying the corresponding amplitude condition in FIG. 6. The DC component of an integral signal from the integrator is eliminated by a capacitor 12, and the bias component of the integral signal is determined by the following voltage divider. The analog switch 17 is synchronously connected to one of the contacts of the voltage divider constituted by resistors 13-1 to 13-5. Similarly, the analog switch 17 is interlocked with the frequency divider 6 and the analog switch 16. The analog switch 17 is connected to one of the contacts of the resistors 13-1 to 13-5 to satisfy the bias condition in FIG. 6 even if any desired period is designated. In this manner, the bias conditions as well as the amplitude conditions are satisfied.

Figure 8A:
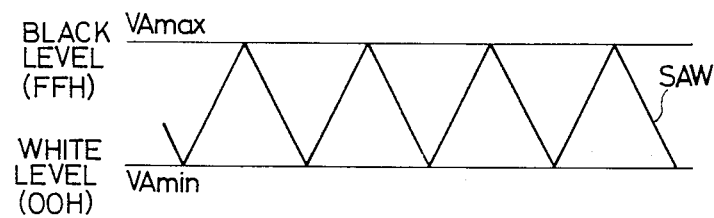
FIGS. 8A and 8B are charts showing the relationships between the triangular wave signal and the analog image signal level in the apparatus of FIG. 7.
Figure 8B:
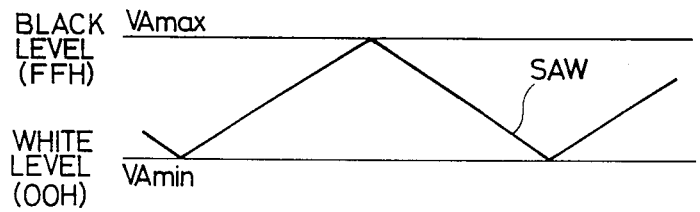

FIGS. 8A and 8B are charts showing the relationships between the triangular wave signal SAW and the analog image signal levels VAmax and VAmin when the designated period varies. In either case, the amplitude and bias conditions of the triangular wave signal SAW in FIG. 6 are satisfied.

Fourth Embodiment

Figure 9:
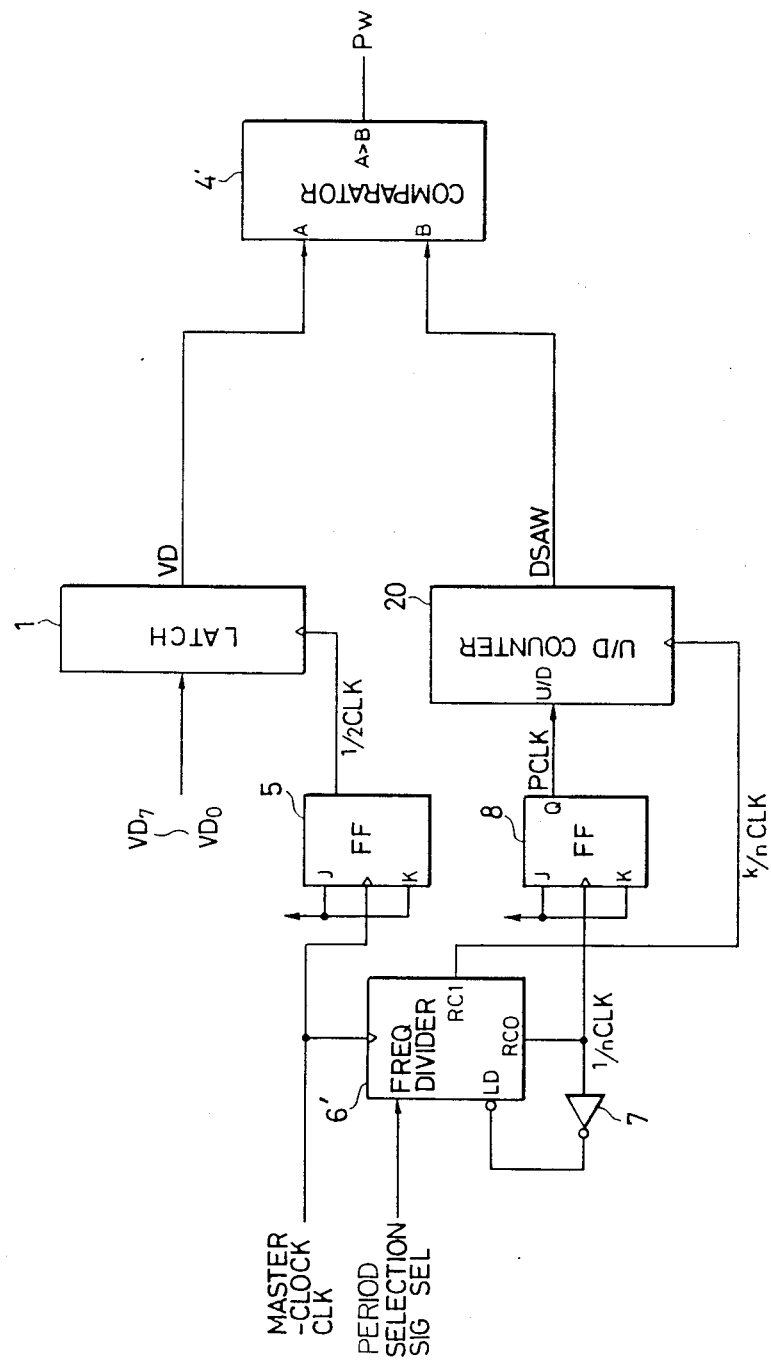
FIG. 9 is a block diagram of an image processing apparatus according to a fourth embodiment of the present invention.

FIG. 9 is a block diagram of an image processing apparatus according to a fourth embodiment wherein the functions of FIG. 7 are achieved by digital elements. The same reference numerals as in FIG. 7 denote the same parts in FIG. 9, and a detailed description thereof will be omitted. Referring to FIG. 9, a frequency divider 6' outputs two types frequency-divided signals CLK/n and kCLK/n. The clock signal kCLK/n always has a frequency k times of the clock signal CLK/n. An up/down counter 20 is incremented at the first half of the pattern clock signal PCLK having a duty ratio of 50% and is decremented at the second half thereof. A count clock from the up/down counter 20 is the clock signal kCLK/n having a frequency k times that of the clock signal CLK/n. The up/down counter 20 always counts up k pulses at the first half of the pattern clock signal PCLK and always counts down k pulses at the second half thereof regardless of the period represented by the signal SEL. A digital comparator 4' compares 8-bit digital video data VD received at an input terminal A thereof and an up/down counter output DSAW received at an input terminal B thereof. If A>B, the comparator 4' outputs a PWM image signal PW. The arrangement of FIG. 7 is thus substituted by the digital elements in FIG. 9, and the amplitude and bias conditions in FIG. 6 are satisfied.

Fifth Embodiment

A fifth embodiment of the present invention will be described with reference to FIGS. 10 to 11B.

Figure 11A:
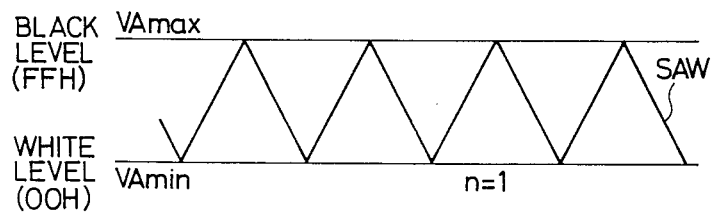
FIGS. 11A and 11B are charts showing the relationships between the triangular wave signal SAW and the level of the analog image signal VA in the apparatus of FIG. 10.
Figure 11B:
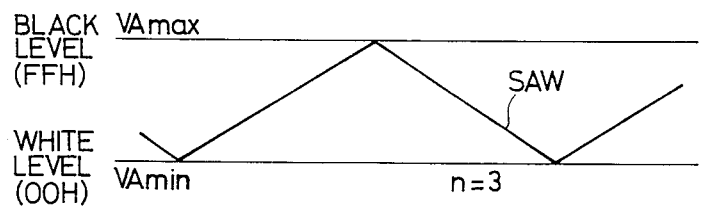
Figure 10:
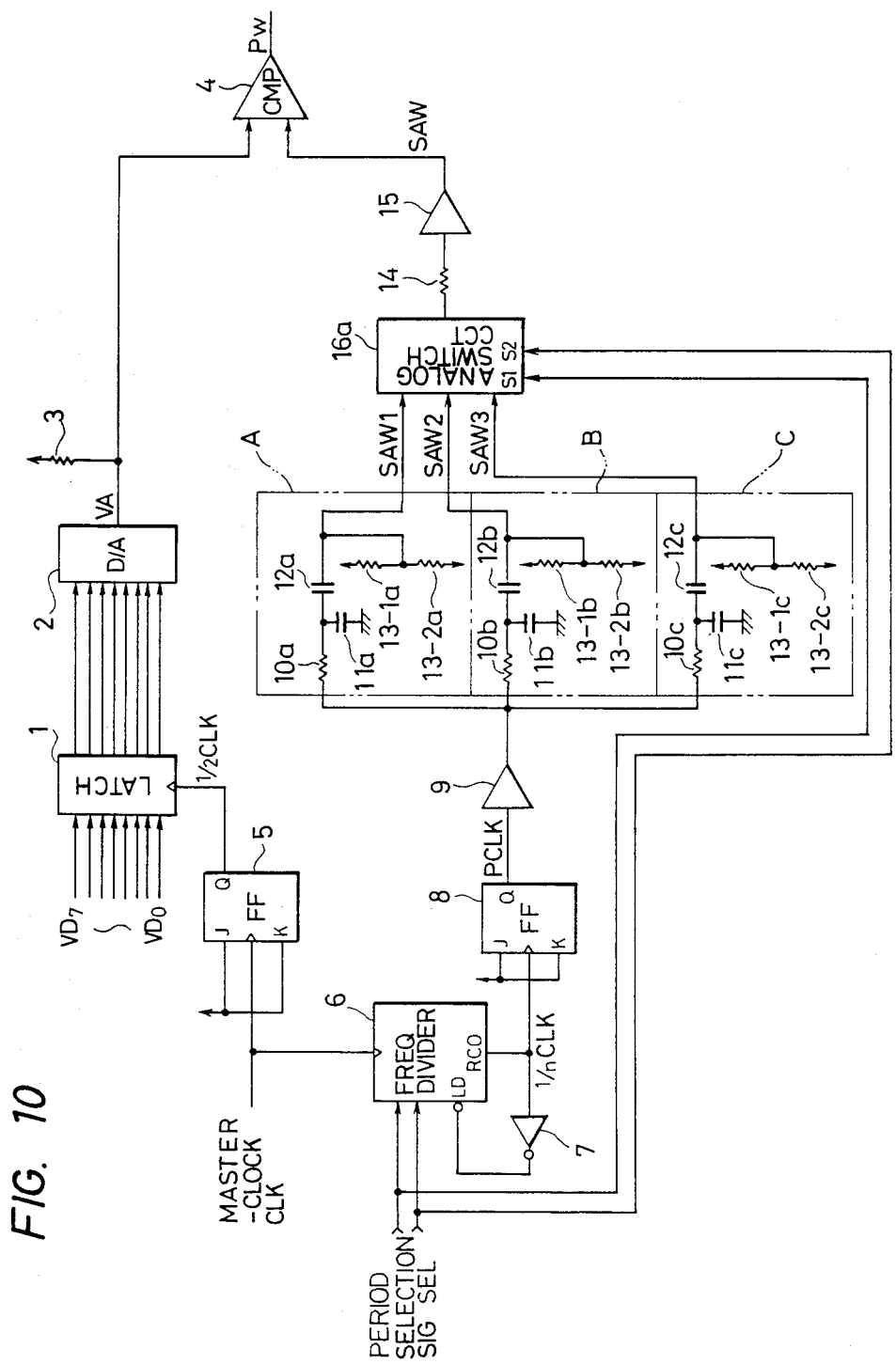
FIG. 10 is a circuit diagram of an image processing apparatus according to a fifth embodiment of the present invention.

FIG. 10 is a circuit diagram of an image processing apparatus of this embodiment, and FIGS. 11A and 11B are charts showing the relationships between the triangular wave signal SAW and the level of the analog image signal VA in the apparatus of FIG. 10. The same reference numerals as in FIG. 5 denote the same parts in FIG. 10, and a detailed description thereof will be omitted. Referring to FIG. 10, an analog switch 16a includes internal electronic switches. One of the electronic switches is turned on according to a given state of select terminals S1 and S2. In this embodiment, a period selection signal SEL is connected from a processor (not shown) to a frequency divider 6 and the analog switch 16a so that the frequency divider 6 can be synchronized with the analog switch 16a. The processor generates the period selection signal SEL according to the type of input image data (the type represents the characteristics or nature of the image). If the period selection signal SEL represents n, the frequency divider 6 generates the clock signal CLK/n, and a JK flip-flop 8 then generates the pattern clock signal PCLK having a duty ratio of 50%. The pattern clock signal PCLK is simultaneously supplied to resistors 10a to 10c and is integrated by integrators having capacitors 11a to 11c and the corresponding resistors 10a to 10c. The time constants of these integrators or triangular wave generating means are determined by the corresponding pairs of resistor and capacitor. The time constant of a triangular wave generating means A is determined by the resistor 10a and the capacitor 11a so as to correspond to the designated period n =1. If the pattern clock signal PCLK corresponds to the designated period n =1, its integrated wave is determined to satisfy the period n =1 and the conditions of the amplitude range of VAmin to VAmax in FIG. 11A. The time constant of a triangular wave signal generating means B is determined by the resistor 10b and the capacitor 11b so as to correspond to the designated period n =2. Similarly, if the pattern clock signal PCLK corresponds the designated period n =2, the integrated waveform is determined to satisy the period n =2 and the conditions for the amplitude range of VAmin to VAmax. The time constant of a triangular wave signal generating means C is determined by the resistor 10c and the capacitor 11c so as to correspond to the predetermined period n =3. If the pattern clock signal PCLK corresponds to the designated period n =3, its integrated waveform is determined to satisfy the period n =3 and the conditions for the amplitude range of VAmin to VAmax in FIG. 11B. The DC components of these integral signals are eliminated by capacitors 12a to 12c, and their bias components are determined by the following voltage divideres 13-1a and 13-2a to 13-1c and 13-2c, respectively. Therefore, the analog switch 16a is synchronized with the frequency divider 6 to select an optimal one of triangular wave signals SAW1 to SAW3 regardless of the designated periods. Therefore, the period and amplitude conditions described with reference to FIG. 6 are always satisfied.

FIGS. 11A and 11B show the relationships between the triangular wave signal SAW and the analog image signal levels VAmax and VAmin when the designated period varies. In any case, the amplitude and bias conditions of the triangular wave signal SAW in FIG. 6 are satisfied.

Sixth Embodiment

A sixth embodiment of the present invention will be described below.

Before describing the sixth embodiment, an arrangement of a pulse width modulator will be described with reference to FIG. 12.

Figure 12:
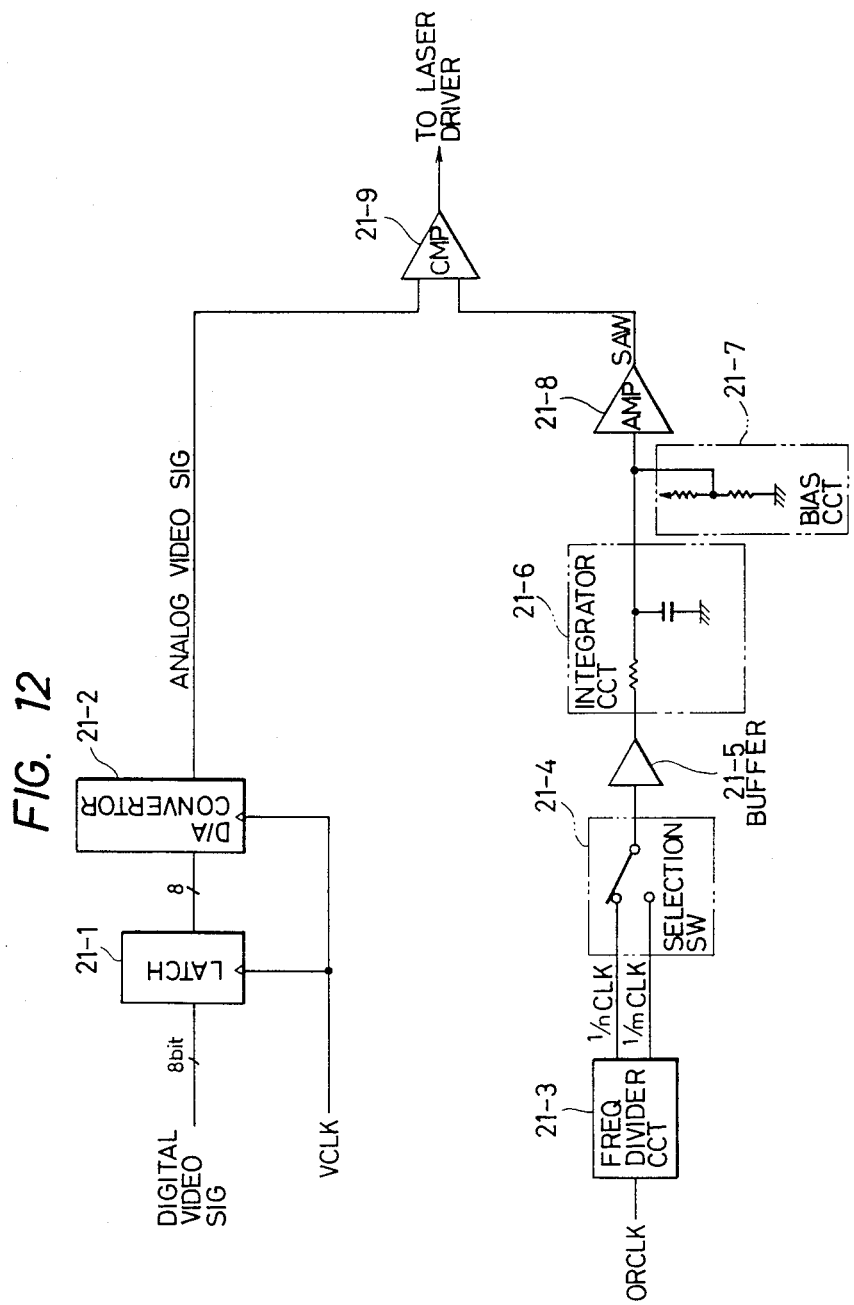
FIG. 12 is a circuit diagram showing an arrangement of a pulse width modulator.

FIG. 12 shows an arrangement for forming a halftone image at a laser beam printer or the like. An input digital image signal is converted into an analog image signal. The analog image signal is compared with a cyclic analog pattern signal such as a triangular wave signal, thereby generating a PWM binary image signal.

Figure 13F:
Figure 13G:

FIGS. 13A to 13G are timing charts of the signals generated in the pulse width modulator in FIG. 12. Referring to FIG. 12, an 8-bit input digital video signal VD is latched and timed by a latched 21-1 in response to a video clock signal VCLK (FIG. 13B). The video clock signal VCLK is a clock signal obtained by dividing a master clock signal ORCLK (FIG. 13A) by a JK flip-flop or the like (not shown) into halves. The latched video signal is converted into an analog video signal VA (FIG. 13D) by a D/A converter 21-2 in response to the video clock signal VCLK. The analog video signal VA is input to one input terminal of a comparator (CMP) 21-9. The master clock signal ORCLK is divided by a frequency divider 21-3 at frequency division ratios of 1/n and 1/m to obtain clock signals CLK/n and CLK/m (FIGS. 13C and 13C') each having a duty ratio of 50%. One of these pattern clock signals CLK/n and CLK/m is selected by a selection switch 21-4. The selected pattern clock signal is input to an integrator 21-6 of a resistor and a capacitor through a buffer 21-5. The integrator 21-6 generates a triangular wave signal (i.e., an analog signal) having the same period as that of the input pattern clock signal. The bias component of the triangular wave signal SAW is adjusted by a bias circuit 21-7. The resultant triangular wave signal SAW is then input to the other input terminal of the comparator 21-9 through a buffer amplifier 21-9 (FIGS. 13E and 13E'). The comparatos 21-9 compares the analog video signal VA with the triangular wave signal SAW (FIG. 13F in which the dotted line represents the analog video signal VA). The analog video signal VA is converted into a PWM binary signal (FIG. 13G) according to the density represented the signal VA.

The binary signal is input to a laser driver (not shown) to turn on/off laser beams.

If the image area represented by an input image signal is changed from a region (image area) whose primary importance is the tonality to a region whose primary importance is the resolution, the selection switch 21-4 is switched to use the signal CLK/m (FIG. 13C'). Therefore, an output from the buffer amplifier 21-8 is a composite triangular wave signal having different periods, as shown in FIG. 13F.

In this case, when the pattern clock is switched, the pattern clock signal has processed by the integrator 21-6 so that the waveform is not so steep and a waveform portion represented by point A in FIG. 13F results in.

As shown in FIG. 13F, if switching of the triangular wave signal is not properly performed in correspondence with the image area, the predetermined binary output cannot be obtained. In an area requiring a high resolution, the edge becomes undesirably moderate. In a area requiring an accurate gray scale level, the edge is undesirably emphasized. In this manner, proper image outputs corresponding to the types of image areas cannot be undesirably obtained.

If the period of the pattern clock signal is simply changed, the amplitude and bias components of the triangular wave SAW are changed, and sufficient pulse width modulation cannot be performed.

Figure 14:
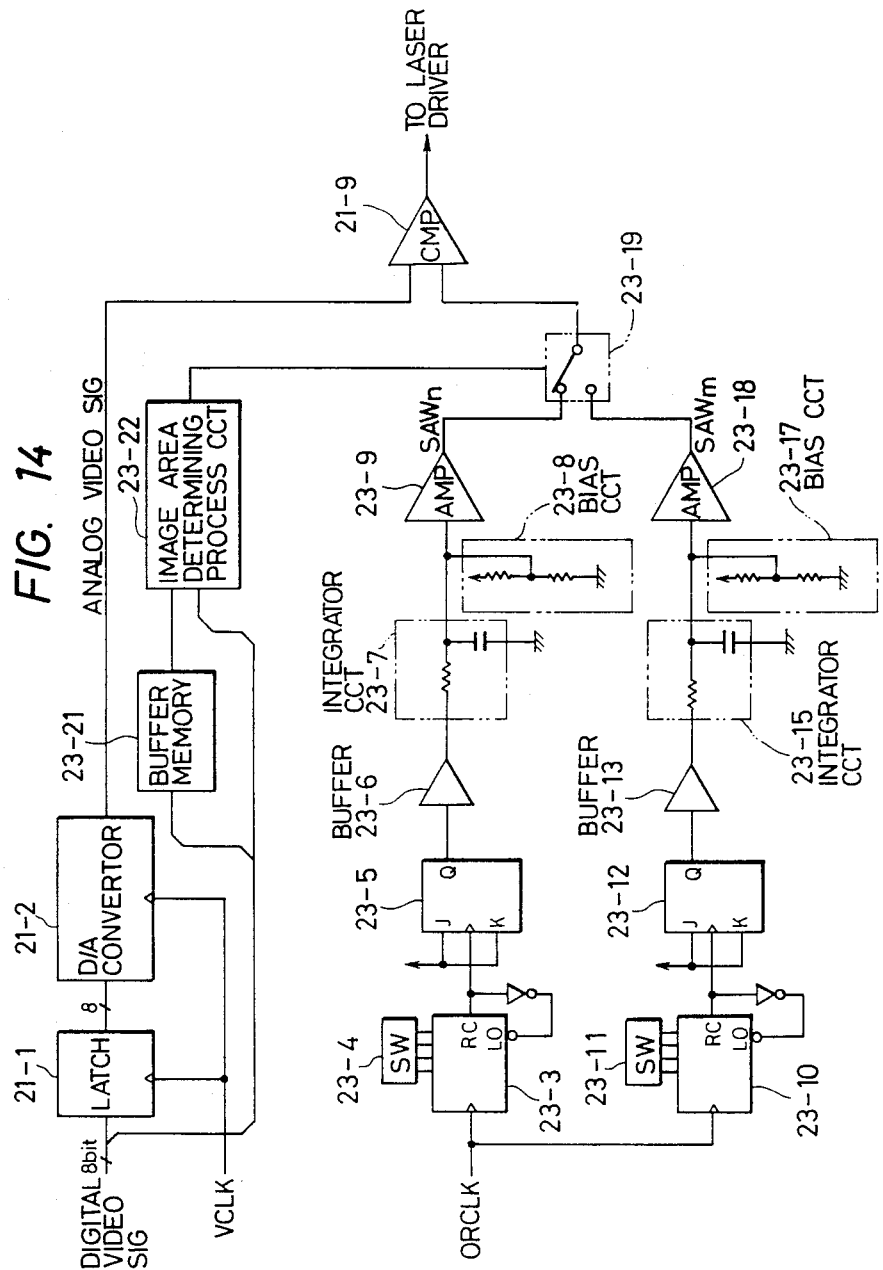
FIG. 14 is a circuit diagram of an image processing apparatus according to a sixth embodiment of the present invention.
Figure 15D:
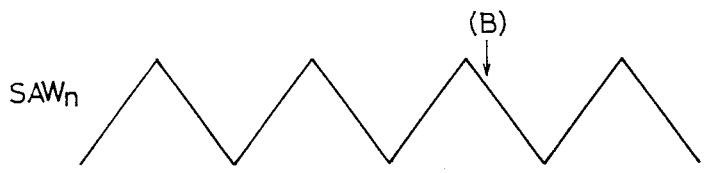
Figure 15D:
Figure 15C:
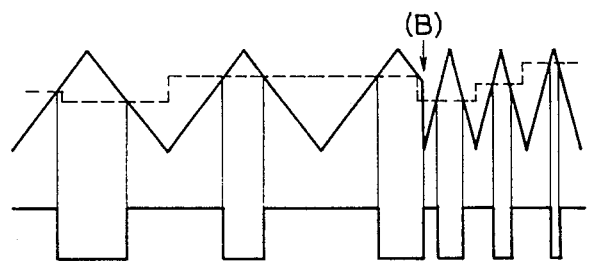

FIG. 14 is a circuit diagram of an image processing apparatus according to a sixth embodiment of the present invention. The same reference numerals as in FIG. 12 denote the same functions in FIG. 14, and a detailed description thereof will be omitted. FIGS. 15A to 15D are timing charts of signals in the circuit of FIG. 14.

Referring to FIG. 14, counters 23-3 and 23-10 frequency-divide a master clock signal ORCLK according to values determined by switches 23-4 and 23-11. The frequency-divided master clock signals are then further divided into halves by JK flip-flops 23-5 and 23-12, respectively. Therefore, the JK flip-flops 23-5 and 23-12 generate pattern clock signals CLK/n and CLK/m each having a duty ratio of 50%, as shown in FIGS. 13C and 13C'.

The pattern clock signals CLK/n and CLK/m are respectively input to integrators 23-7 and 23-15 each constituting of a resistor and a capacitor through buffers 23-6 and 23-13. The integrators 23-7 and 23-15 generate triangular wave signals (the pattern signal) SAWn (FIG. 15A) and SAWm (FIG. 15B). The bias components of the triangular wave signals SAWn and SAWm are adjusted by bias circuits 23-8 and 23-17, respectively. The resultant signals are input to a switch 23-19 through buffer amplifiers 23-9 and 23-18.

One of the triangular wave signals SAWn and SAWm is selected by the switch 23-19. The selected signal is input to the other input terminal of the comparator 21-9. The comparator 21-9 compares the analog video signal and the selected triangular wave signal (FIG. 15C in which the dotted line represents the analog video signal VA). The analog video signal VA is thus converted into a PWM binary signal (FIG. 15D) according to the density.

The 8-bit input digital video signal VD is input to the latch 21-1, a buffer memory 23-21, and an image area determining process circuit 23-22.

The image area determining process circuit 23-22 determines the type of image (i.e., the type represents the characteristics or nature of the image) by utilizing an output from the buffer memory 23-21. The switch 23-19 is changed over according to the determination result. In this embodiment, the image area determining process circuit 23-22 determined whether each pixel is located in the area (i.e., an area of a halftone image such as a photograph) whose primary importance is the gradation or the area (i.e., an area of a line image such as a character). If the process circuit 23-22 determines that the pixel is located in the halftone area, it selects the triangular wave signal (FIG. 15A) having a long period. Otherwise, the process circuit 23-22 selects the triangular wave signal (FIG. 15B) having a short period.

The operation of the above apparatus will be described in more detail with reference to the wave-forms of FIGS. 15A to 15D. If the image area is changed from the halftone area to the line image area at point B, the waveform of the triangular wave signal is changed such that each vertex of the wave is more acute.

The triangular wave can be immediately changed upon changing of the image area from the halftone image to the line image area. Therefore, a reproduced output (i.e., the PCM binary signal) of high quality can be obtained. The amplitudes and the bias components of the triangular waves SAWn and SAWm output from the buffer amplifiers 23-9 and 23-18 are preferably kept unchanged. The relationship between the amplitude of the input image signal and the amplitude of the triangular wave signal is predetermined regardless of any selection of the triangular wave signal. Therefore, a reproduced image of high quality can be obtained.

If the circuit in FIG. 14 is applied to a laser printer or the like, the input image signal and the triangular wave may be generated in response to a known BD (Beam Detection) signal (i.e., a signal representing the horizontal scanning position of the laser beam). As a result, the triangular waves can be generated at accurate timings in units of main scanning lines. A desired screen in the reproduced image can be formed, thus obtaining a reproduced image of high quality.

In the above embodiment, two types of triangular waves are prepared and selectively used. However, the number of triangular waves may be three or more. These triangular waves may be selectively used according to the types of images. In this embodiment, the triangular waves in FIGS. 15A and 15B are used as the pattern signals. However, the pattern signal may be of any shape.

Figure 16:
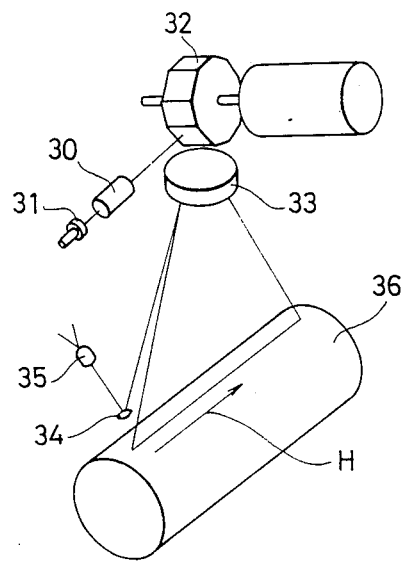
FIG. 16 is a schematic perspective view of a scanning optical system of a laser beam printer to which the present invention is applied.

FIG. 16 is a schematic perspective view of a laser beam printer (a raster scanning printer) scanning optical system to which the present invention is applied. The scanning system in FIG. 16 has a semiconductor laser for emitting a laser beam modulated in response to the PWM signal described above. A laser beam modulated by a semiconductor laser 31 is collimated by a collimator lens 30. The collimated beam is deflected by a polygonal rotary mirror (applying means) 32 having a plurality of reflecting surfaces. The deflected beam is focused on a photosensitive drum 36 by a focusing lens 33 called an f-θ lens. During beam scanning, the leading end of the optical beam of one-line scanning is reflected by a mirror 34 to guide it to a beam detector (sensor) 35. A beam detection (BD) signal from the beam detector 35 is used as a horizontal sync signal along a scanning direction H (horizontal direction).

The present invention is not limited to the embodiments described above. Various changes and modifications may be made within the spirit and scope of the appended claims.

What is claimed is:

1. An image processing apparatus comprising:
   image signal generating mean for generating an image signal; and
   pulse width modulated signal generating means for processing the image signal from said image signal generating means by using a pattern signal and outputting a pulse width modulated signal;
   wherein said pulse width modulated signal generating means comprises pattern signal generating means for generating first and second pattern signals having different periods but an identical amplitude, and wherein said pulse width modulated signal generating means are capable of generating and selectively using a first pulse width modulated signal corresponding to the first pattern signal and a second pulse width modulated signal corresponding to the second pattern signal.

2. An apparatus accoroding to claim 1, wherein the first and second pattern signals are triangular wave signals, respectively.

3. An apparatus according to claim 1, wherein said pulse width modulated signal generating means comprises selecting means for selecting one of the first and second pattern signals, and comparing means for comparing the image signal with the pattern signal selected by said selecting means to form the pulse width modulated signal.

4. An apparatus according to claim 3, wherein said image signal generating means comprises D/A converting means for converting the digital input image signal into an analog image signal, the analog image signal from said D/A converting means being input to said comparing means.

5. An apparatus according to claim 1, wherein said pattern signal generating means comprises clock signal generating means for generating first and second clock signals having different periods so as to form the first and second pattern signals and first and second pattern signal generators for receiving the first and second clock signals and forming the first and second pattern signals, said clock signal generating means being adapted to select one of the first and second clock signals in response to a predetermined designation signal, and said selecting means being adapted to select one of outputs from said first and second pattern signal generators in response to the predetermined designation signal.

6. An apparatus according to claim 1, wherein said pattern signal generating means comprises clock signal generating means for generating first and second clock signals having different periods so as to form the first and second pattern signals, wherein said clock signal generating means selects and generates one of the first and second clock signals in response to a predetermined designation signal, said pattern signal generating means comprises a plurality of elements for receiving the first and second clock signals and generating the first and second pattern signals, and said selecting means selects said plurality of elements in response to the predetermined designation signal so as to generate one of the first and second pattern signals.

7. An apparatus according to claim 5, wherein the predetermined designataion signal is a signal representing characteristics of an image.

8. An apparatus according to claim 6, wherein the predetermined designation signal is a signal representing characteristics of an image.

9. An apparatus according to claim 1, wherein the first and second pattern signals have different periods but an identical amplitude and identical bias level.

10. An apparatus according to claim 1, wherein said pattern signal generating means further comprises a first pattern signal generating circuit for generating said first pattern signal and a second pattern signal generating circuit different from said first pattern signal generated circuit, for generating said second pattern signal.

11. An apparatus according to claim 10, wherein said image signal generating means further comprises D/A converting means for converting the digital input signal into an analog image signal, said analog image signal being compared with said first or second pattern signal to form said first or second pulse width modulated signal.

12. An image processing apparatus comprising:
    image signal generating means for generating an image signal; and
    pulse width modulated signal generating means for processing the image signal generated by said image signal generating means by using a pattern signal and outputting a pulse width modulated signal;
    wherein said pulse width modulated signal generating means comprises pattern signal generating means for generating first and second pattern signals having respective different periods but an identical bias level, and wherein said pulse width modulated signal generating means is capable of generating and selectively using a first pulse width modulated signal corresponding to the first pattern signal and a second pulse width modulated signal corresponding to the second pattern signal.

13. An apparatus according to claim 12, wherien said pulse width modulated signal generating means comprises selecting means for selecting one of the first and second pattern signals, and comparing means for comparing the image signal with the pattern signal selected by said selecting means to form the pulse width modulated signal.

14. An apparatus according to claim 13, wherein said image signal generating means comprises D/A converting means for converting the digital input image signal into an analog image signal, the analog image signal from said D/A converting means being input to said comparing means.

15. An apparatus according to claim 14, wherein the first and second pattern signals have different periods but an identical amplitude and identical bias level.

16. An apparatus according to claim 12, wherein the first and second pattern signals are triangular wave signals, respectively.

17. An apparatus according to claim 12, wherein said pattern signal generating means further comprises a first pattern signal generating circuit for generating said first pattern signal and a second pattern signal generating circuit different from said first pattern signal generated circuit, for generating said second pattern signal.

18. An apparatus according to claim 17, wherein said image signal generating means further comprises D/A converting means for converting the digital input signal into an analog image signal, said analog image signal being compared with said first or second pattern signal to form said first or second pulse width modulated signal.

19. An image processing apparatus comprising:
digital image signal generating means for generating a digital image signal;
converting means for receiving the digital image signal generated by said digital image signal generating means and outputting a converted digital image signal; and
pulse width modulated signal generating means for processing the converted digital image signal outputted from said converting means by using a pattern signal and outputting a pulse width modulated signal;
wherein said pulse width modulated signal generating means comprises pattern signal generating means for generating first and second pattern signals having different periods and selecting means for selecting one of the first and second pattern signals, and said converting means changes a conversion mode of the digital image signal in association with the selection operation of said selecting means.

20. An apparatus according to claim 19, wherein said converting means comprises a plurality of tables for receiving the digital image signal as an address signal and outputting the converted digital image signal, said plurality of tables being selected on the basis of the selection operation of said selecting means.

21. An apparatus according to claim 20, wherein said pulse width modulated signal generating means comprises D/A converting means for converting the converted digital image signal to an analog image signal, and comparing means for comparing the analog image signal with the pattern signal selected by said selecting means and forming the pulse width modulated signal.

22. An apparatus according to claim 19, wherein said pattern signal generating means comprises clock signal generating means for generating first and second clock signals having different periods so as to form the first and second pattern signals, and said selecting means selects one of the first and second clock signals.

23. An apparatus according to claim 19, wherein the first and second pattern signals are triangular wave signals, respectively.

24. An image processing apparatus comprising:
image signal generating means for generating an image signal; and
pulse width modulated signal generating means for processing the image signal generated by said image signal generating means by using a pattern signal and outputting a pulse width modulated signal;
wherein said pulse width modulated signal generating means comprises first and second pattern signal generators, said first and second pattern signal generators being capable of simultaneously generating first and second pattern signals having different periods but an identical amplitude level.

25. An apparatus according to claim 24, further comprising means for selecting one of outputs from said first and second pattern signal generators.

26. An apparatus according to claim 24, wherein said pulse width modulated signal generating means comprises selecting means for selecting one of the first and second pattern signals, and comparing means for comparing the image signal with the pattern signal selected by said selecting means to form the pulse width modulated signal.

27. An apparatus according to claim 26, wherein said image signal generating means comprises D/A converting means for converting the digital input image signal into an analog image signal, the analog image signal from said D/A converting means being input to said comparing means.

28. An apparatus according to claim 24, wherein the first and second pattern signals are triangular wave signals, respectively.

29. An apparatus according to claim 24, wherein said pulse width modulated signal generating means are capable of generating and selecting using a first pulse width modulated signal corresponding to the first pattern signal and a second pulse width modulated signal corresponding to the second pattern signal.

30. An image processing apparatus comprising:
image signal generating means for generating an image signal;
pulse width modulated signal generating means for processing the image signal generated by said image signal generating means by using a pattern signal and outputting a pulse width modulated signal;
wherein said pulse width modulated signal generating means comprises first and second pattern signal generators, said first and second pattern signal generators being capable of simultaneously generating first and second pattern signals having different periods; and
means for receiving an image signal generated from said image signal generating means and discriminating whether the image signal represents a halftone image;
wherein said pulse width modulated signal generating means is capable of generating a first pulse width modulated signal corresponding to the first pattern signal and a second pulse width modulated signal corresponding to the second pattern signal, and the first or second pulse width modulated signal is used in accordance with the discrimination result by said discriminating means.

31. An apparatus according to claim 32, wherein the first and second pattern signals are triangular wave signals, respectively.

32. An apparatus according to claim 30, wherein said pulse width modulated signal generating means comprises comparing means for comparing the image signal with the pattern signal selected in accordance with the discrimination result by said discriminating means to form the pulse width modulated signal.

33. An apparatus according to claim 26, wherein said image signal generating means comprises D/A converting means for converting the digital input image signal into an analog image signal, the analog image signal from said D/A converting means being input to said comparing means.

34. An image processing apparatus comprising:
image signal generating means for generating an image signal; and
pulse width modulated signal generating means for processing the image signal from said image signal generating means by using a pattern signal and outputting a pulse width modulated signal,
wherein said pulse width modulated signal generating means further comprises pattern signal generating means for generating first and second pattern signals having different periods, said pulse width modulated signal generating means being capable of generating and selectively using a first pulse width modulated signal corresponding to said first pattern signal and a second pulse width modulated signal corresponding to said second pattern signal, and wherein said pattern signal generating means further comprises a first pattern signal generating circuit for generating said first pattern signal and a second pattern signal generating circuit different from said first pattern signal generating circuit, for generating said second pattern signal.

35. An apparatus according to claim 34, wherein the first and second pattern signals are triangular wave signals.

36. An apparatus according to claim 34, wherein said pulse width modulated signal generating means further comprises selecting means for selecting one of the first and second pattern signals, and comparing means for comparing the image signal with the pattern signal selected by said selecting means to form the pulse width modulated signal.

37. An apparatus according to claim 34, wherein the first and second pattern signals have different periods but an identical amplitude and identical bias level.

38. An apparatus according to claim 34, wherein said pattern signal generating means further comprises a first pattern signal generating circuit for generating said first pattern signal and a second pattern signal generating circuit different from said first pattern signal generated circuit, for generating said second pattern signal.

* * * * *

UNITED STATES PATENT AND TRADEMARK OFFICE
CERTIFICATE OF CORRECTION

PATENT NO. : 4,870,499

DATED : September 26, 1989

INVENTOR(S) : YOSHIYUKI SUZUKI, ET AL.          Page 1 of 3

It is certified that error appears in the above-identified patent and that said Letters Patent is hereby corrected as shown below:

TITLE PAGE,
IN [56] REFERENCES CITED

FOREIGN PATENT DOCUMENTS, --74795 3/1983 European Pat. Off.-- should be inserted.

Before Primary Examiner, insert --OTHER PUBLICATIONS 1977 SID International Symposium Digest of Technical Papers, pgs. 124-135 ("Adaptive Switching of Dispersed & Clustered Halftone Patterns for By-level Image Rendition")--.

COLUMN 2

Line 61, "a" should read --an--.

COLUMN 3

Line 5, "ot" should read --to--.
    Line 11, "conjenction" should read --conjunction--.

COLUMN 5

Line 20, "sync selection signal SEL" should read --period selection signal SEL--.
    Line 56, "Second Embodiment" should be a heading.
    Line 61, "FIG. 2," should read --FIG. 4,--.

UNITED STATES PATENT AND TRADEMARK OFFICE
CERTIFICATE OF CORRECTION

PATENT NO. : 4,870,499
DATED : September 26, 1989
INVENTOR(S) : YOSHIYUKI SUZUKI, ET AL.

Page 2 of 3

It is certified that error appears in the above-identified patent and that said Letters Patent is hereby corrected as shown below:

COLUMN 8

Line 3, "corresponds" should read --corresponds to--.
    Line 16, "voltage divideres 13-1a" should read
        --voltage dividers 13-1a--.
    Line 45, "latched 21-1" should read --latch 21-1--.
    Line 68, "buffer amplifier 21-9" should read
        --buffer amplifier 21-8--.

COLUMN 9

Line 1, "comparatos 21-9" should read
        --comparator 21-9--.
    Line 6, "represented" should read --represented by--.
    Line 18, "has processed" should read --is processed--.
    Line 20, "results in." should read --results.--.
    Line 25, "a" should read --an--.

COLUMN 10

Line 10, "determined" should read --determines--.
    Line 20, "wave-forms" should read --waveforms--.

COLUMN 11

Line 9, "image signal generating mean" should read
        --image signal generating means--.
    Line 25, "accoroding" should read --according--.
    Line 41, "claim 1," should read --claim 3,--.
    Line 55, "claim 1," should read --claim 3,--.

UNITED STATES PATENT AND TRADEMARK OFFICE
CERTIFICATE OF CORRECTION

PATENT NO. : 4,870,499

DATED : September 26, 1989

INVENTOR(S) : YOSHIYUKI SUZUKI, ET AL.

Page 3 of 3

It is certified that error appears in the above-identified patent and that said Letters Patent is hereby corrected as shown below:

COLUMN 12

Line 2, "designataion" should read --designation--.
    Line 14, "generated" should read --generating--.
    Line 41, "wherien" should read --wherein--.
    Line 64, "generated" should read --generating--.

COLUMN 14

Line 14, "selecting" should read --selectively--.
    Line 44, "claim 32," should read --claim 30,--.
    Line 53, "claim 26," should read --claim 32,--.

COLUMN 16

Line 15, "generated" should read --generating--.

Signed and Sealed this

Twenty-fourth Day of December, 1991

*Attest:*

HARRY F. MANBECK, JR.

*Attesting Officer*      *Commissioner of Patents and Trademarks*